United States Patent
Bedell

(10) Patent No.: US 9,101,912 B2
(45) Date of Patent: Aug. 11, 2015

(54) METHOD FOR REGENERATION OF SOLID AMINE $CO_2$ CAPTURE BEDS

(71) Applicant: ALSTOM Technology Ltd, Baden (CH)

(72) Inventor: Stephen Alan Bedell, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/924,074

(22) Filed: Jun. 21, 2013

(65) Prior Publication Data

US 2014/0123850 A1   May 8, 2014

Related U.S. Application Data

(60) Provisional application No. 61/722,454, filed on Nov. 5, 2012.

(51) Int. Cl.
*B01J 20/34* (2006.01)
*B01D 53/04* (2006.01)
*B01D 53/62* (2006.01)
*B01D 53/81* (2006.01)

(52) U.S. Cl.
CPC ............ *B01J 20/3475* (2013.01); *B01D 53/04* (2013.01); *B01D 53/62* (2013.01); *B01D 53/81* (2013.01); *B01D 2252/204* (2013.01); *B01D 2253/206* (2013.01); *B01D 2253/25* (2013.01); *B01D 2257/504* (2013.01); *Y02C 10/04* (2013.01); *Y02C 10/06* (2013.01); *Y02C 10/08* (2013.01)

(58) Field of Classification Search
CPC .................. B01D 2252/204; B01D 2253/206;
B01D 2253/25; B01D 2257/504; B01D 53/04; B01D 53/62; B01D 53/81; B01J 20/3475; Y02C 10/04; Y02C 10/06; Y02C 10/08
See application file for complete search history.

(56) References Cited

U.S. PATENT DOCUMENTS

| | | |
|---|---|---|
| 2,487,576 A | 11/1949 | Meyers |
| 2,608,461 A | 8/1952 | Frazier |
| 3,255,233 A | 6/1966 | Kunze et al. |
| 3,407,045 A | 10/1968 | Temple |
| 3,498,026 A | 3/1970 | Messinger et al. |
| 3,563,696 A | 2/1971 | Benson |
| 3,896,212 A | 7/1975 | Ecikmeyer |
| 5,318,758 A | 6/1994 | Fujii et al. |
| 5,344,627 A | 9/1994 | Fujii et al. |
| 5,378,442 A | 1/1995 | Fujii et al. |
| 5,618,506 A | 4/1997 | Suzuki et al. |
| 6,117,404 A | 9/2000 | Mimura et al. |
| 6,423,282 B1 | 7/2002 | Araki et al. |
| 6,485,547 B1 | 11/2002 | Iijima |

(Continued)

FOREIGN PATENT DOCUMENTS

| | | |
|---|---|---|
| EP | 0 502 596 | 9/1992 |
| EP | 0 879 631 | 5/2002 |

(Continued)

*Primary Examiner* — Christopher P Jones
(74) *Attorney, Agent, or Firm* — Cynthia W. Flanigan

(57) ABSTRACT

A carbon dioxide capture system includes a solid sorbent material including an amine. A base solution is in communication with the sorbent material when the amine becomes deactivated. The base solution is removed from the sorbent material when the amine is regenerated by the base solution.

10 Claims, 3 Drawing Sheets

(56) References Cited

U.S. PATENT DOCUMENTS

| | | |
|---|---|---|
| 6,645,446 B1 | 11/2003 | Won et al. |
| 6,764,530 B2 | 7/2004 | Iijima |
| 6,800,120 B1 | 10/2004 | Won et al. |
| 6,883,327 B2 | 4/2005 | Iijima et al. |
| 7,056,482 B2 | 6/2006 | Hakka et al. |
| 7,316,737 B2 | 1/2008 | Mimura et al. |
| 7,377,967 B2 | 5/2008 | Reddy et al. |
| 2004/0226441 A1 | 11/2004 | Palmer |
| 2006/0204425 A1 | 9/2006 | Kamijo et al. |
| 2006/0248890 A1 | 11/2006 | Iijima et al. |
| 2008/0056972 A1 | 3/2008 | Iijima |
| 2008/0072762 A1 | 3/2008 | Gal |
| 2008/0223215 A1 | 9/2008 | Iijima et al. |
| 2009/0068078 A1 | 3/2009 | Grobys et al. |
| 2009/0305870 A1 | 12/2009 | Chung |
| 2010/0003177 A1 | 1/2010 | Aroonwilas et al. |
| 2010/0005722 A1 | 1/2010 | Iijima et al. |
| 2010/0050637 A1 | 3/2010 | Yamashita et al. |
| 2010/0258005 A1 | 10/2010 | Oishi et al. |
| 2010/0326074 A1 | 12/2010 | Okita et al. |
| 2011/0033359 A1 | 2/2011 | Papenheim et al. |
| 2011/0185897 A1 | 8/2011 | Wright et al. |

FOREIGN PATENT DOCUMENTS

| | | |
|---|---|---|
| EP | 1 695 756 | 8/2006 |
| EP | 2 085 133 | 8/2009 |
| EP | 2 258 461 | 12/2010 |
| EP | 2 269 711 | 1/2011 |
| EP | 2 269 712 | 1/2011 |
| EP | 2 269 713 | 1/2011 |
| EP | 2 286 894 | 2/2011 |
| FR | 2 938 454 | 2/2010 |
| GB | 871207 | 6/1961 |
| JP | 2009214089 | 9/2009 |
| JP | 2009215186 | 9/2009 |
| WO | 95/17250 A1 | 6/1995 |
| WO | WO 02/09849 | 2/2002 |
| WO | WO 03/013699 | 2/2003 |
| WO | WO 2004/005818 | 1/2004 |
| WO | WO 2005/069965 | 8/2005 |
| WO | WO 2007/009461 | 1/2007 |
| WO | WO 2007/019632 | 2/2007 |
| WO | WO 2007/068733 | 6/2007 |
| WO | WO 2007/107004 | 9/2007 |
| WO | WO 2008/094777 | 8/2008 |
| WO | WO 2009/003238 | 1/2009 |
| WO | WO 2009/004307 | 1/2009 |
| WO | WO 2009/035340 | 3/2009 |
| WO | WO 2009/065218 | 4/2009 |
| WO | WO 2009/104744 | 8/2009 |
| WO | WO 2009/112518 | 9/2009 |
| WO | WO 2010/010720 | 1/2010 |
| WO | WO 2010/051604 | 5/2010 |
| WO | WO 2010/102877 | 9/2010 |
| WO | WO 2010/105754 | 9/2010 |
| WO | WO 2010/113364 | 10/2010 |
| WO | WO 2010/122830 | 10/2010 |
| WO | WO 2010133484 | 11/2010 |
| WO | WO 2010/142716 | 12/2010 |

METHOD FOR REGENERATION OF SOLID AMINE CO₂ CAPTURE BEDS

CROSS-REFERENCE TO RELATED APPLICATION

This application claims the benefit of U.S. Provisional Patent Application Ser. No. 61/722,454; filed on Nov. 5, 2012, entitled "A METHOD FOR REGENERATION OF SOLID AMINE CO2 CAPTURE BEDS" which is incorporated herein by reference in its entirety.

TECHNICAL FIELD

The present disclosure is generally directed to a system and method for regeneration of carbon dioxide ($CO_2$) capture beds comprising solid amines, and in particular is directed to treating deactivated solid amines in the $CO_2$ capture beds with a base solution to regenerate the amines for further $CO_2$ capture.

BACKGROUND

In the combustion of a fuel, such as coal, oil, natural gas, peat, waste, etc., in a combustion plant, such as those associated with boiler systems for providing steam to a power plant, a hot process gas (or flue gas) is generated. Such a flue gas will often contain, among other things, carbon dioxide ($CO_2$). The negative environmental effects of releasing $CO_2$ to the atmosphere have been widely recognized, and have resulted in the development of processes adapted for removing $CO_2$ from the hot process gas generated in the combustion of the above mentioned fuels. Systems and methods for removing $CO_2$ from a gas stream include $CO_2$ capture systems in which a flue gas is contacted with an aqueous absorbent solution such as, for example, a chilled ammonia based ionic solution.

Chemical adsorbtion with amines is also one such $CO_2$ capture technology being explored. Capturing $CO_2$ gas from a flue gas stream by subjecting the flue gas stream to an adsorbent that is coated onto a solid material or substrate is sometimes referred to an adsorbent coated substrate (ACS). There are two types of these coated substrates—one in which amines are attached via adsorbtion and another in which amines are covalently attached to the substrate. Amines can be used as the adsorbent because they can be coated on the solid material and are useful for $CO_2$ capture because they can increase the capacity of the $CO_2$. However, the flue gases also contain strong acid gases such as sulfur dioxide ($SO_2$) and sulfur trioxide ($SO_3$) which react with the amines and reduce the ability of the amine to react with and adsorb $CO_2$.

SUMMARY

According to aspects illustrated herein, there is provided a carbon dioxide capture system which includes a solid sorbent material comprising an amine applied thereto via covalent bond linkages. A base solution is in communication with the sorbent material when the amine becomes deactivated. The base solution is removed from the sorbent material when the amine is regenerated by the base solution.

According to further aspects illustrated herein, there is provided a method for regenerating solid sorbent material in a $CO_2$ removal system. The method includes providing a sorbent layer having a solid deactivated amine that is incapable of capturing $CO_2$ applied thereto. A base solution is dispersed on the solid deactivated amine, thereby reacting the base solution with the deactivated amine. The deactivated amine is regenerated into an amine capable of capturing $CO_2$.

The above described and other features are exemplified by the following figures and in the detailed description.

BRIEF DESCRIPTION OF THE DRAWINGS

Referring now to the figures, which are exemplary embodiments, and wherein the like elements are numbered alike:

FIG. 2b is a schematic cross-section of the monolithic unit, as seen in the direction of the arrows 2b-2b of FIG. 2a.

FIG. 2c is an enlarged schematic cross-section of a wall of the monolithic unit of FIG. 2a.

DETAILED DESCRIPTION

There is disclosed herein a system and method for carbon dioxide ($CO_2$) capture including a system and method for regeneration of $CO_2$ capture beds comprising solid amines. The system and method for regeneration of the $CO_2$ capture beds is directed to treating deactivated solid amines in the $CO_2$ capture beds with a base solution to regenerate the amines for further $CO_2$ capture. In one embodiment, the base solution is a dilute solution of NaOH which has a concentration thereof from 1 wt % to 50 wt %, preferably from 1 wt % to 10 wt %. In one embodiment, the base solution is a dilute solution of KOH which has a concentration thereof from 1 wt % to 50 wt %, preferably from 1 wt % to 10 wt %. While, NaOH and KOH are described, solutions of $Na_2CO_3$ or $K_2CO_3$ or slurries of CaO can be employed without departing of the broader aspects disclosed herein.

Figure 1:
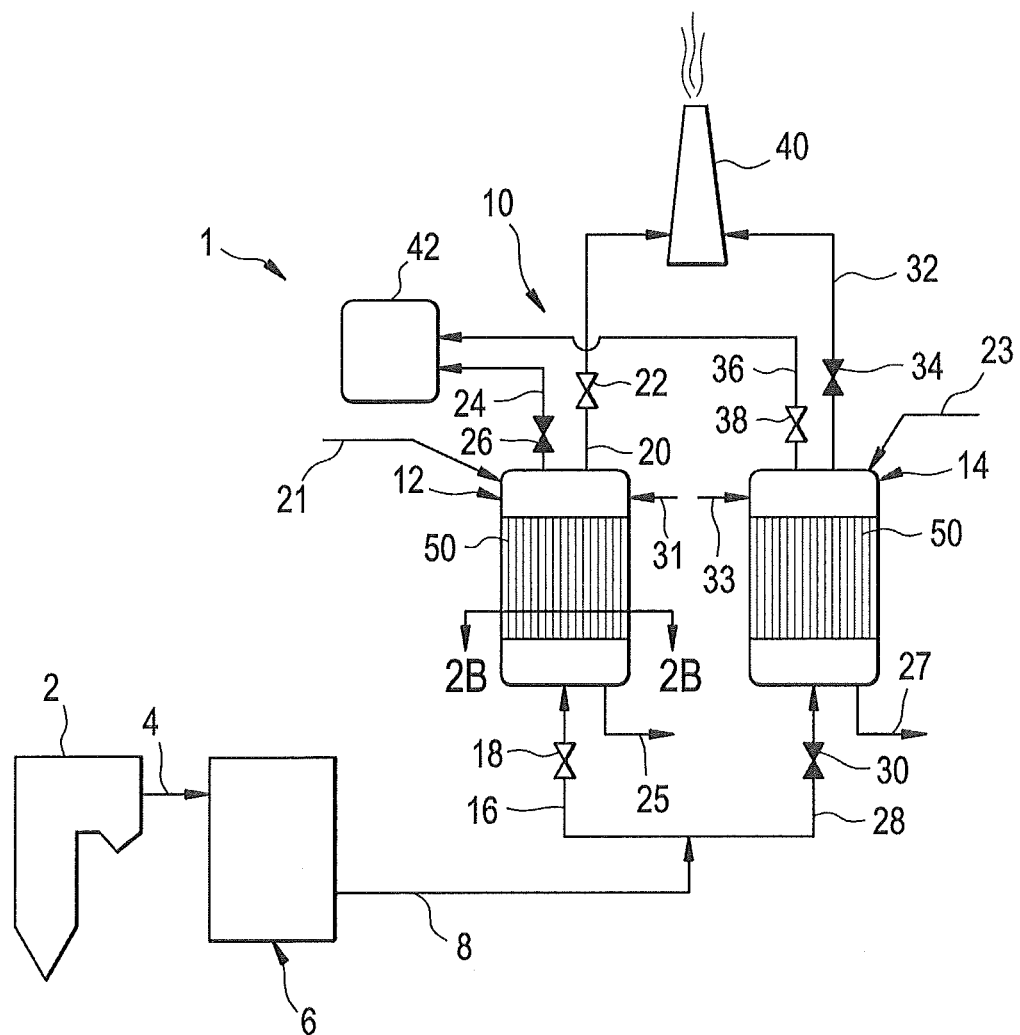
FIG. 1 is a schematic diagram of a power plant comprising a system for removing carbon dioxide from a process gas.

FIG. 1 is a schematic view of a power plant generally designated by the numeral 1. The power plant 1 includes a boiler 2 in which a fuel, such as coal, oil, peat, or waste, is combusted under generation of heat. The combustion also generates a hot process gas, which is often referred to as a flue gas. The flue gas includes contaminants such as, but not limited to, $CO_2$, sulfur oxides ($SO_X$), nitrogen oxides ($NO_X$), fly ash, dust, soot, mercury, and the like. The boiler 2 is in communication with a gas cleaning system 6 via a duct 4. The gas cleaning system 6 includes a fly ash removal device, such as an electrostatic precipitator; a wet scrubber for removing sulfur dioxide ($SO_2$) and hydrochloric acid; and/or a selective catalytic reduction unit for removing nitrogen oxides.

As illustrated in FIG. 1, the gas cleaning system 6 is in communication with a carbon dioxide capture system 10 via the duct 8. The carbon dioxide capture system 10 includes a first adsorber vessel 12 and a second adsorber vessel 14. The first and second adsorber vessels 12, 14 are identical in design. The first adsorber vessel 12 is in communication with the duct 8 via a flue gas supply duct 16, which is provided with a shut off valve 18. The first adsorber 12 is in communication with a stack 40 via a flue gas disposal duct 20, which is provided with a shut off valve 22. The first adsorber 12 is in communication with a carbon dioxide storage tank 42 via a carbon dioxide disposal duct 24, which is provided with a shut off valve 26. Similarly, the second adsorber vessel 14 is in communication with the duct 8 via a flue gas supply duct 28, which is provided with a shut off valve 30. The second adsorber 14 is in communication with the stack 40 via a flue gas discharge duct 32, which is provided with a shut off valve 34. The second adsorber 14 is in communication with the carbon dioxide storage tank 42 via a carbon dioxide disposal duct 36, which is provided with a shut off valve 38.

As shown in FIG. 1, the first adsorber vessel 12 has an inlet line 21 for supplying a base solution to the first adsorber vessel 12 for treatment of the sorbent material 50 as described herein. Likewise, the second adsorber vessel 14 has an inlet line 23 for supplying the base solution to the second adsorber vessel 14 for treatment of the sorbent material 50 as described herein. The first adsorber vessel 12 has a water inlet line 31 and the second adsorber vessel 14 has a water inlet line 33 for rinsing the base solution from the sorbent material 50. The first adsorber vessel 12 has an outlet line 25 for discharging the base solution and water from the first adsorber vessel. The second adsorber vessel 14 has an outlet line 27 for discharging the base solution from the second adsorber vessel.

Although the power plant 1 is shown and described as having the first and second adsorber vessels 12, 14, the present disclosure is not limited in this regard as the power plant may also be provided with three, four or even more adsorber vessels in parallel and/or series configurations. The number of adsorber vessels is determined by factors, such as, but not limited to the need for redundancy and the time for desorbtion of carbon dioxide versus the time for adsorbtion of carbon dioxide. It is also possible to operate with one single adsorber vessel. In the latter case the power plant would need to be shut down during the desorbtion mode, or the process gas would need to be released via a by-pass without any carbon dioxide being removed therefrom during the desorbtion mode.

In the embodiment illustrated in FIG. 1, the first adsorber vessel 12 is shown in an adsorbtion mode and is operative for adsorbing carbon dioxide from the flue gas. Hence, the valve 18 is open to allow flue gas from the duct 8 to enter the adsorber vessel 12 via the flue gas supply duct 16. Furthermore, the valve 22 is open, such that flue gas, from which carbon dioxide has been, at least partly, removed, may leave the first adsorber vessel 12 via the flue gas disposal duct 20, via which the flue gas may be emitted to the ambient air via a stack 40. The valve 26 is closed thereby isolating the first adsorber vessel 12 from the carbon dioxide storage tank 42.

In the embodiment illustrated in FIG. 1, the second adsorber vessel 14 is shown in a desorbtion mode, and is operative for desorbtion of carbon dioxide that has previously been removed from the flue gas. Hence, the valve 30 is closed, such that no flue gas can enter the adsorber vessel 14 via the flue gas supply duct 28. The valve 34 is also closed, such that no gas may leave the adsorber vessel 14 via the flue gas disposal duct 32. Furthermore, the valve 38 is open, such that carbon dioxide, which has been released from the second adsorber vessel 14, may leave the vessel 14 via the carbon dioxide disposal duct 36. The carbon dioxide disposal duct 36 forwards the carbon dioxide to a carbon dioxide storage tank 42, in which the carbon dioxide is stored until it is finally used or disposed of.

Figure 2A:
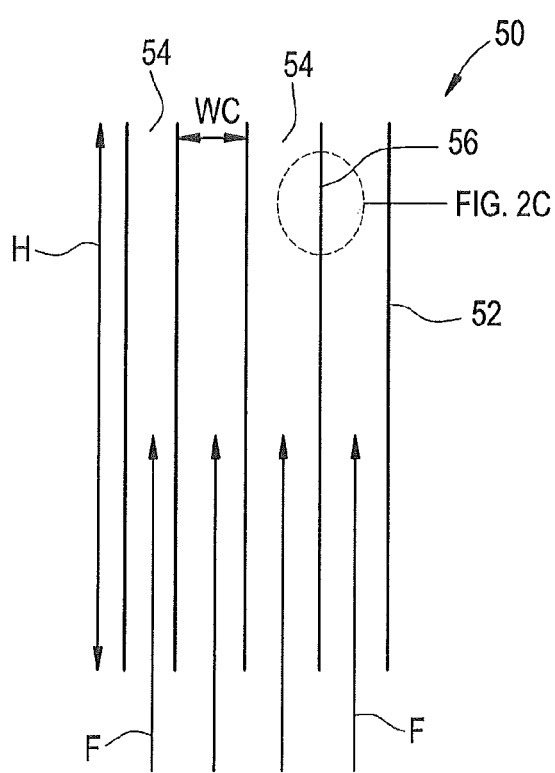
FIG. 2a is a schematic cross-section of a monolithic unit being operative for adsorbtion and desorbtion of carbon dioxide.

Each adsorber vessel 12, 14 is provided with a solid sorbent material 50. FIG. 2a is an enlarged cross-sectional side view of the sorbent material 50. The sorbent material 50 comprises a monolithic unit 52 having a number of channels 54 defined by adjacent walls 56, through which the gas, illustrated as F in FIG. 2a, can flow. The walls 56 define a substrate 58 with a sorbent layer 60 adhered thereto, as described further below with reference to FIG. 2C. The monolithic unit 52 is of a flow-through type. In the adsorbtion mode the gas F is flue gas, and in the desorbtion mode the gas F is carbon dioxide.

Figure 2B:
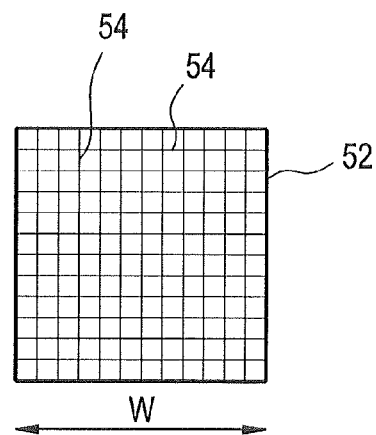

FIG. 2a is a cross-section illustrating the monolithic unit 52 as seen along the line 2b-2b of FIG. 1. In the embodiment illustrated in FIG. 2b, the unit 52 has a square section. While the monolithic unit 52 is shown and described as having a square section, the present disclosure is not limited in this regard as, monolithic units having a circular section or another shape which is suitable for packing into the adsorber vessels 12 and 14, may be employed. In the embodiment shown in FIGS. 2a and 2b the channels 54 have a square section, with a width WC. As an alternative, the channels 54 may, for example, have a rectangular, triangular, or circular cross-section. The sorbent material 50 could comprise one single monolithic unit 52, but could comprise a number of monolithic units that have been packed together in the respective adsorber vessel 12, 14.

Figure 2C:
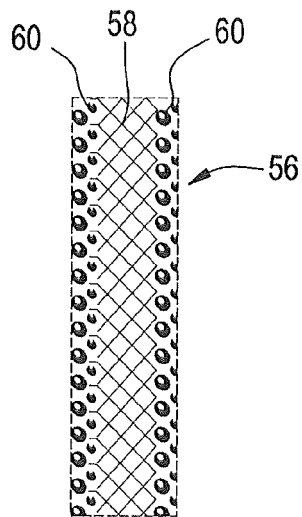

FIG. 2c illustrates an enlarged portion of one of the walls 56 of the monolithic unit 52. A central portion of the wall 56 is defined by a substrate 58. The substrate 58 contributes to the physical strength of the monolithic unit 52, and also provides a large surface area yielding an effective contact with the gas F. On both sides of the substrate 58 a solid sorbent layer 60 is provided. The sorbent layer 60 comprises an amine and a catalyst that have been applied to, solidified and immobilized on the substrate 58 via a covalent bond linkage.

While the sorbent material 50 is shown and described as comprising a flow-through type monolithic unit 52 the present disclosure is not limited in this regard as other configurations of the sorbent material may be employed, including, but not limited, to wall-flow type monolithic unit in which the flue gas flows through walls of the unit and configurations in which the sorbent material is in a particulate form and supported on a stationary or moving bed or contained within a fluidized bed.

The amine may be any type that is suitable for adsorbtion and desorbtion of carbon dioxide. The amine may be a primary, a secondary, or a tertiary amine, or mixtures thereof. A primary amine has one of three hydrogen atoms in ammonia replaced by an organic substituent bound to the nitrogen atom. A secondary amine has two organic substituents bound to the nitrogen atom together with one hydrogen atom. In tertiary amines all three hydrogen atoms are replaced by organic substituents bonded to the nitrogen atom. The amine is preferably a secondary amine, or a mixture of a secondary amine together with a primary and/or a tertiary amine. Amines that are particularly suitable for incorporation in the sorbent layer 60 are amines that are secondary amines and/or amines that include alcohol (OH) functionality, examples of such amines being diethanolamine (DEA), diisopropanolamine (DIPA), and 2-hydroxyethyl piperazine (HEP).

Figure 3:
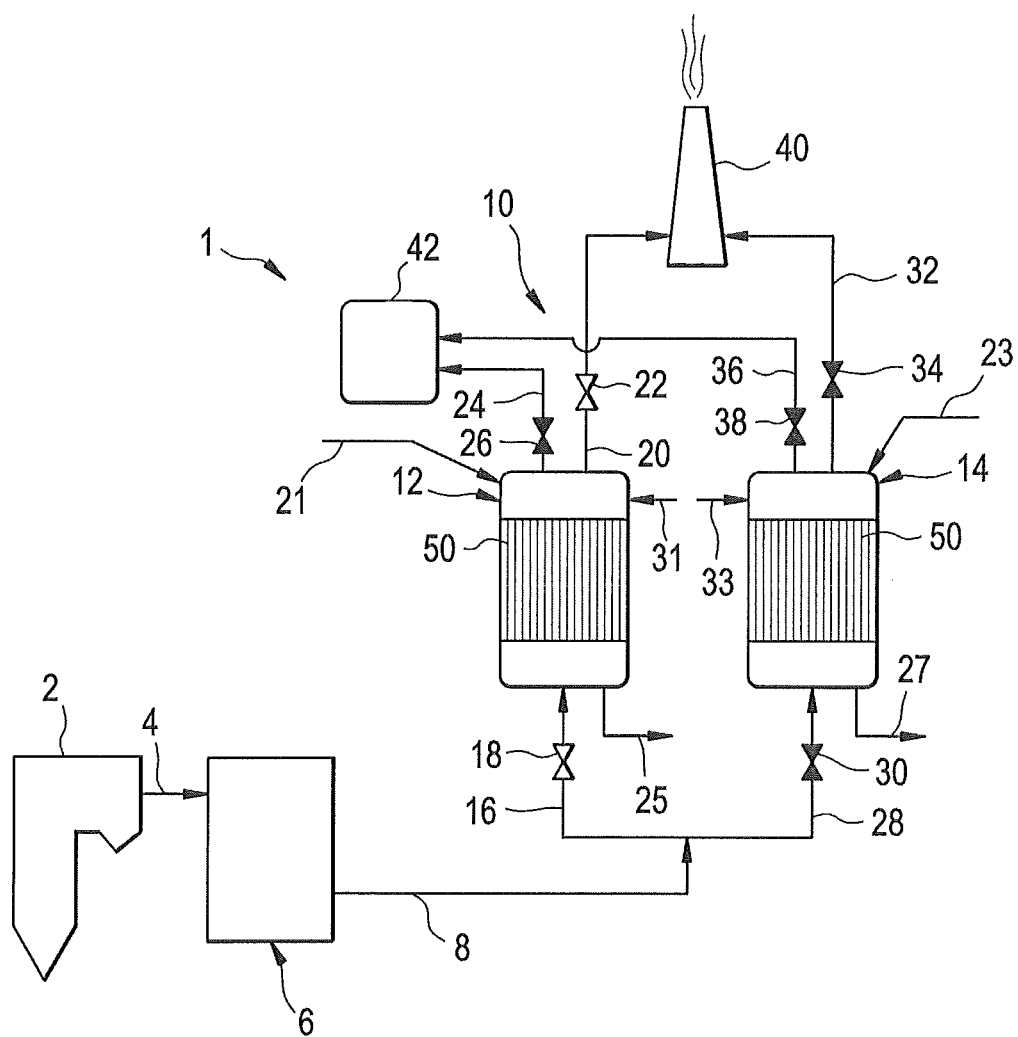
FIG. 3 is a schematic diagram of the power plant of FIG. 1 shown in an alignment for regeneration of a sorbent material.

Referring to FIG. 3, the carbon dioxide removal system 10 is shown in a regeneration alignment with the second adsorber vessel 14 configured for regeneration. In the regeneration configuration the second adsorber vessel 14 is: 1) isolated from the flue gas supply duct 28 by the shut off valve 30 being closed; 2) isolated from the stack 40 by shut off valve 34 being closed; and 3) isolated from the carbon dioxide storage tank 42 by shut off valve 28 being closed. While the second adsorber vessel 14 is shown and described as being in the regeneration alignment, the present disclosure is not limited in this regard as the first adsorber vessel 12 can also be configured in the regeneration alignment by closing shut off valves, 18, 22 and 26.

The first and second adsorber vessels 12, 14 are identical in design and operate in a parallel mode, with one of the adsorber vessels being in adsorbtion mode adsorbing carbon dioxide from the flue gas (e.g., the first adsorber vessel 12 as shown in FIG. 1), and the other adsorber vessel being in desorbtion mode releasing carbon dioxide (e.g., the second adsorber vessel 14 as shown in FIG. 1), such that the carbon dioxide removal capacity is regenerated. The first and second adsorber vessels 12, 14 are operated in an alternating manner, such that one adsorber vessel collects carbon dioxide from the flue gas, while the other adsorber vessel is discharges $CO_2$ therefrom. Hence, when one adsorbtion vessel is full with carbon dioxide it is taken off-line for discharge of $CO_2$ therefrom, and the other adsorbtion vessel is put on-line.

When the flue gas passes, in the adsorbtion mode, through the channels 54 of the monolithic unit 52, the carbon dioxide present in the flue gas will be effectively adsorbed by the amine of the sorbent layer 60 due to the large surface area of the porous material of the sorbent layer 60 and the catalyst included in the sorbent layer 60 making such adsorbtion efficient. To remove the $CO_2$ from the sorbent layer 60, the sorbent layer is heated for example, by a steam source or via a heat exchanger (not shown). In one embodiment, in the desorbtion mode, the sorbent layer 60 is heated to about 60 to 150° C. When the temperature of the monolithic unit 52 is raised, in the desorbtion mode, the carbon dioxide will be effectively released from the amine of the sorbent layer 60 due in part to the large surface area of the porous material of the sorbent layer 60 and a carbon dioxide catalyst (e.g., organo-metallic complex catalysts, inorganic metal complex catalysts, metal oxides, and metal halides) included in the sorbent layer 60 and the thermally reversible nature of the chemical reaction of amine with $CO_2$. While the $CO_2$ is described as being removed from the sorbent layer 60 by heating, the present disclosure is not limited in this regard as the $CO_2$ can be removed from the sorbent layer 60 by other means including, but not limited to the use of inert gases or vacuum sources.

However, over time, the sorbent layer 60 can become deactivated when the amine group incorporated therein becomes incapable of reacting with $CO_2$. For example, the amine groups irreversibly react with acids stronger than $CO_2$ that are present in the flue gas. Such acidic gases present in the flue gas include, but are not limited to, $SO_2$, $SO_3$, HCL, HF and oxides of nitrogen. $SO_2$ is the most prevalent of these gases. In the presence of moisture in the flue gas $SO_2$ will react with the amine groups to form bisulfate salts thereby causing a reduction or termination of the ability of the amine group to react with $CO_2$. In general, the amine groups in the sorbent layer 60 react with moist acid gases according to the following equation:

$$—NR_2+HX\rightarrow—NR_2H^+X \quad\quad (Eq. 1)$$

Eq. 1 illustrates that the acid gas neutralizes the amine group by the protonation of the amine group and formation of the heat stable salt—$NR_2H^+X$ and renders the amine group incapable of reacting with $CO_2$, which is referred to as deactivated amine. The reaction illustrated in Eq. 1 is thermally irreversible.

Prior art methods and efforts have therefore been directed to reducing or eliminating $SO_2$ upstream of the carbon dioxide removal system 10, via wet and dry flue gas desulfurization (FGD) systems. However, even small amounts of $SO_2$ entering the carbon dioxide removal system 10 can deactivate the amine groups in the sorbent layer 60 over time.

The present disclosure includes a method for regenerating the solid sorbent layer 60 in the $CO_2$ removal system 10. The method includes treating deactivated amine in the $CO_2$ sorbent layer 60 with a base solution to regenerate the amine for further $CO_2$ capture. In one embodiment, the method includes operating the first adsorber vessel 12 and/or the second adsorber vessel 14 in the regeneration alignment, wherein a base solution such as a dilute solution of sodium hydroxide (NaOH) or potassium hydroxide (KOH) is supplied to either the first adsorber vessel 12 and/or the second adsorber vessel 14.

For example, as shown in FIG. 3, the second adsorber vessel 14 is configured in a regeneration alignment with the shut off valves 30, 34 and 38 closed, after the $CO_2$ has been removed therefrom, for example by the addition of heat and transport of the $CO_2$ to the carbon dioxide storage tank 42. Another way to effect this regeneration is by using a sweep gas deficient in $CO_2$ such as nitrogen, air or steam. Thus regeneration of the deactivated amine in the sorbent layer 60 occurs in the absence of significant amounts of $CO_2$ and depends upon the amount heat input for regeneration and the flow of an inert gas. While the regeneration of the deactivated amine in the sorbent layer 60 is described as occurring after removal of the $CO_2$ from the adsorber vessel 14 and in the absence of significant amounts of $CO_2$, the present disclosure is not limited in this regard, as the regeneration of the deactivated amine in the sorbent layer 60 can also occur before the removal of the $CO_2$ from the adsorber vessel 14 and in the presence of $CO_2$.

During operation of the second adsorber vessel 14 in the regeneration alignment, a base solution such as a dilute solution of sodium hydroxide (NaOH) or potassium hydroxide (KOH) is supplied to the adsorber vessel 14 via the base solution inlet line 23. The base solution is dispersed on the sorbent material 50 and thereby communicating with the sorbent layer 60 which comprises the deactivated amine. A suitable amount (e.g., quantity and flow rate) of the base solution is supplied to the second adsorber vessel 14 so that enough hydroxide ions ($OH^-$) are provided to chemically reverse the protonation of the deactivated amine (i.e., converting the thermally stable salts back into active amine groups that are capable of reacting with and capturing $CO_2$). When a sufficient amount of the thermal stable salts are converted back to active amine groups, the flow of base solution is terminated and the base solution discharged from the adsorber vessel 14 via the outlet line 27. Excess or unreacted base solution is washed from the sorbent layer 60 of the sorbent material 50 by the introduction of a water wash via the water inlet line 33. The water and any unreacted or excess base solution is discharged from the adsorber vessel 14 via the outlet line 27. While the operation of the adsorber vessel 14 in the regeneration alignment is shown and described, the sorbent layer 60 of the sorbent material 50 in the adsorber vessel 12 can be regenerated in a manner similar to that described above for the adsorber vessel 14. Moreover, the adsorber vessel 12 and the adsorber vessel 14 can be operated in the regeneration alignment individually or simultaneously and can be operated in conjunction with any number of other adsorber vessels.

In one embodiment, the base solution is a dilute solution of NaOH which has a concentration thereof from 1-50 wt %, preferably from 1-10 wt %.

In one embodiment, the base solution is a dilute solution of KOH which has a concentration thereof from 1-50 wt %, preferably from 1-10 wt %.

While the present invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for regenerating solid sorbent material in a carbon dioxide ($CO_2$) removal system, the method comprising:
   providing a solid sorbent layer having a deactivated amine that is incapable of capturing CO2 applied thereto;
   dispersing a base solution on the solid sorbent layer;
   reacting the base solution with the deactivated amine; and
   regenerating the deactivated amine into an amine capable of capturing $CO_2$.

2. The method of claim 1, wherein the base solution comprises NaOH having a concentration of 1-50 wt %.

3. The method of claim 1, wherein the base solution comprises KOH having a concentration of 1-50 wt %.

4. The method of claim 1, wherein the deactivated amine is a heat stable salt generated from reaction of the amine capable of capturing $CO_2$ with an acid gas.

5. The method of claim 4, wherein the acid gas is selected from the group consisting of SO2, SO3, HCl, HF and oxides of nitrogen.

6. The method of claim 1, wherein the amine capable of capturing $CO_2$ is selected from the group consisting of, a primary, a secondary, a tertiary amine, and combinations thereof.

7. The method of claim 1, wherein the amine capable of capturing CO2 is selected from the group consisting of, diethanolamine (DEA), diisopropanolamine (DIPA), and 2-hydroxyethyl piperazine (HEP).

8. The method of claim 1, wherein the base solution is dispersed on the solid sorbent layer in an amount sufficient to provide enough hydroxide ions to chemically reverse protonation of the deactivated amine.

9. The method of claim 1, wherein after the regenerating the deactivated amine the sorbent layer is washed with water to remove excess or unreacted base solution therefrom.

10. The method of claim 1, wherein the regenerating the deactivated amine occurs in the presence of a gas deficient in $CO_2$.

* * * * *